July 24, 1962

R. E. RICHARDSON 3,046,169

PREPRESSING OF LAMINATED SAFETY GLASS PANELS

Filed March 17, 1958

Inventor
Ronald E. Richardson
By Cushman, Darby & Cushman
Attorneys

July 24, 1962  R. E. RICHARDSON  3,046,169

PREPRESSING OF LAMINATED SAFETY GLASS PANELS

Filed March 17, 1958  8 Sheets-Sheet 2

Inventor
Ronald E. Richardson
By Cushman, Darby & Cushman
Attorneys

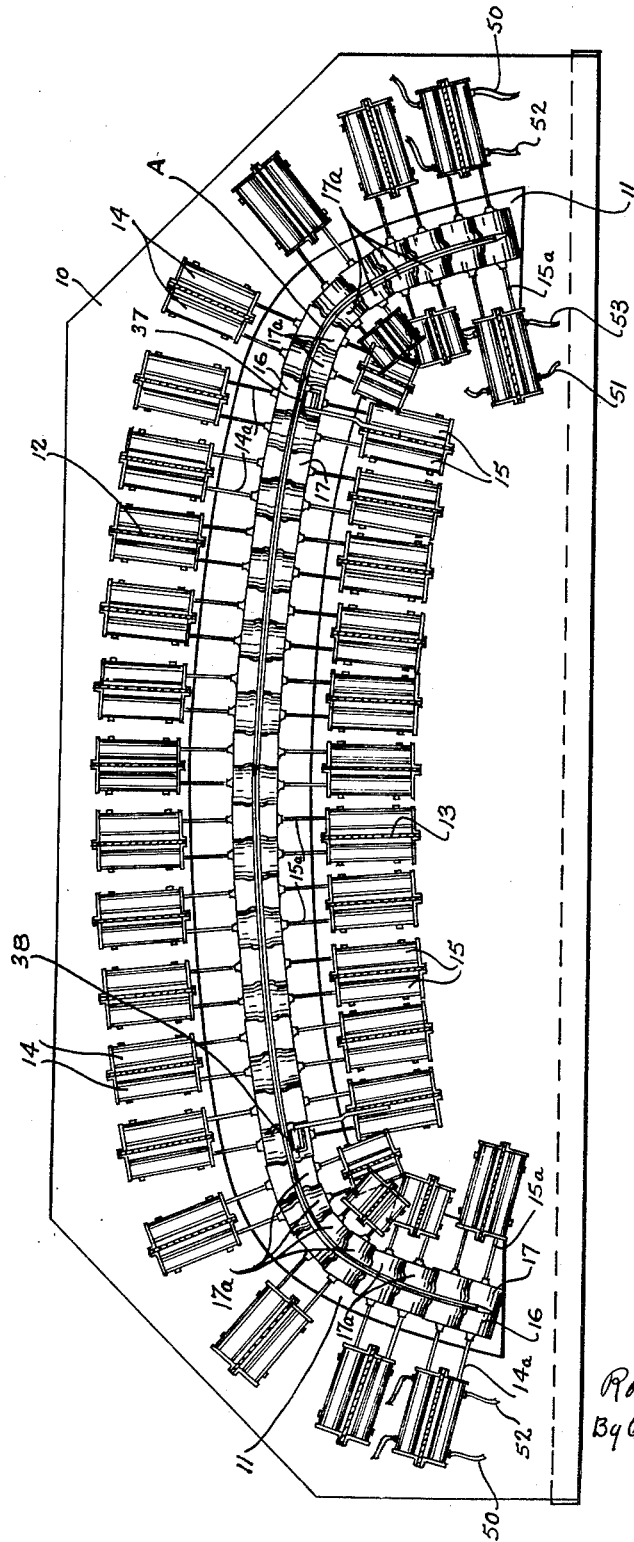

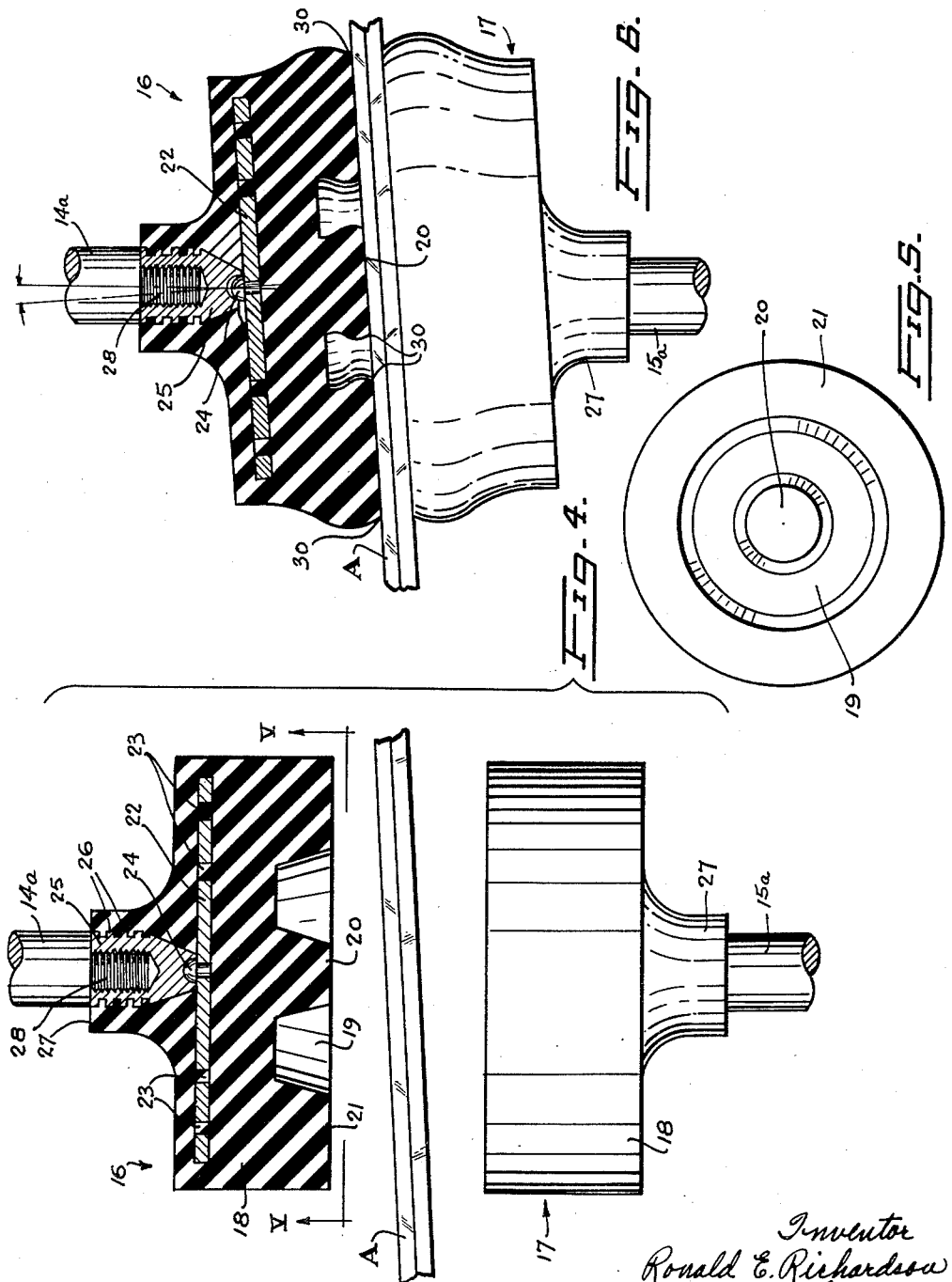

July 24, 1962  R. E. RICHARDSON  3,046,169
PREPRESSING OF LAMINATED SAFETY GLASS PANELS
Filed March 17, 1958  8 Sheets-Sheet 5

Inventor
Ronald E. Richardson
By Cushman, Darby & Cushman
Attorneys

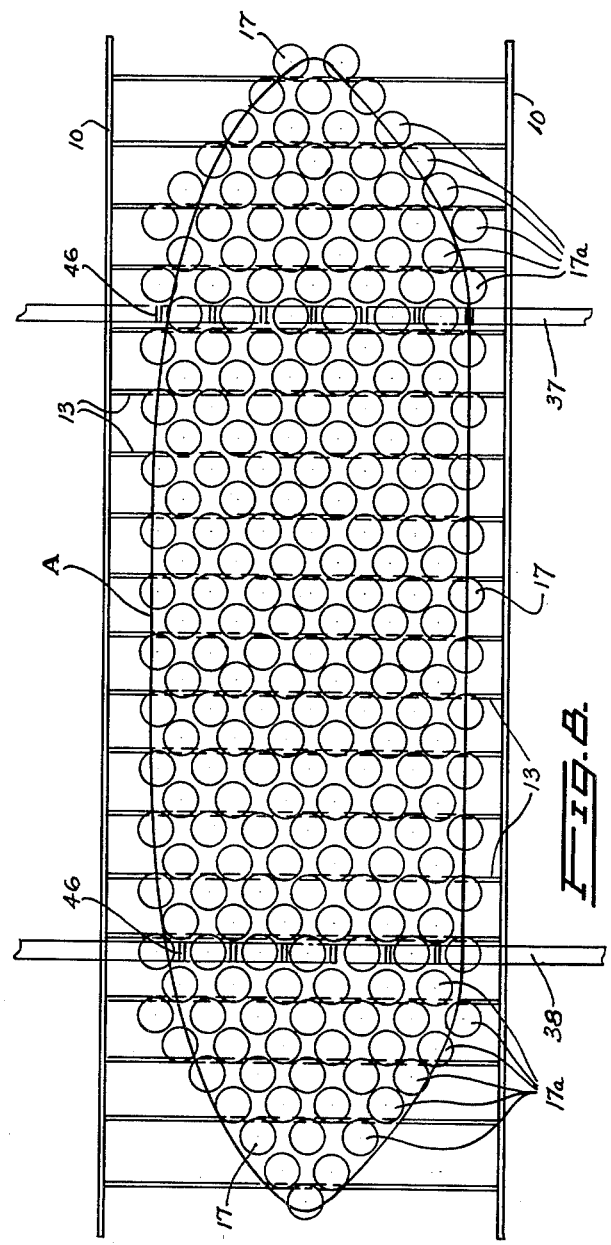

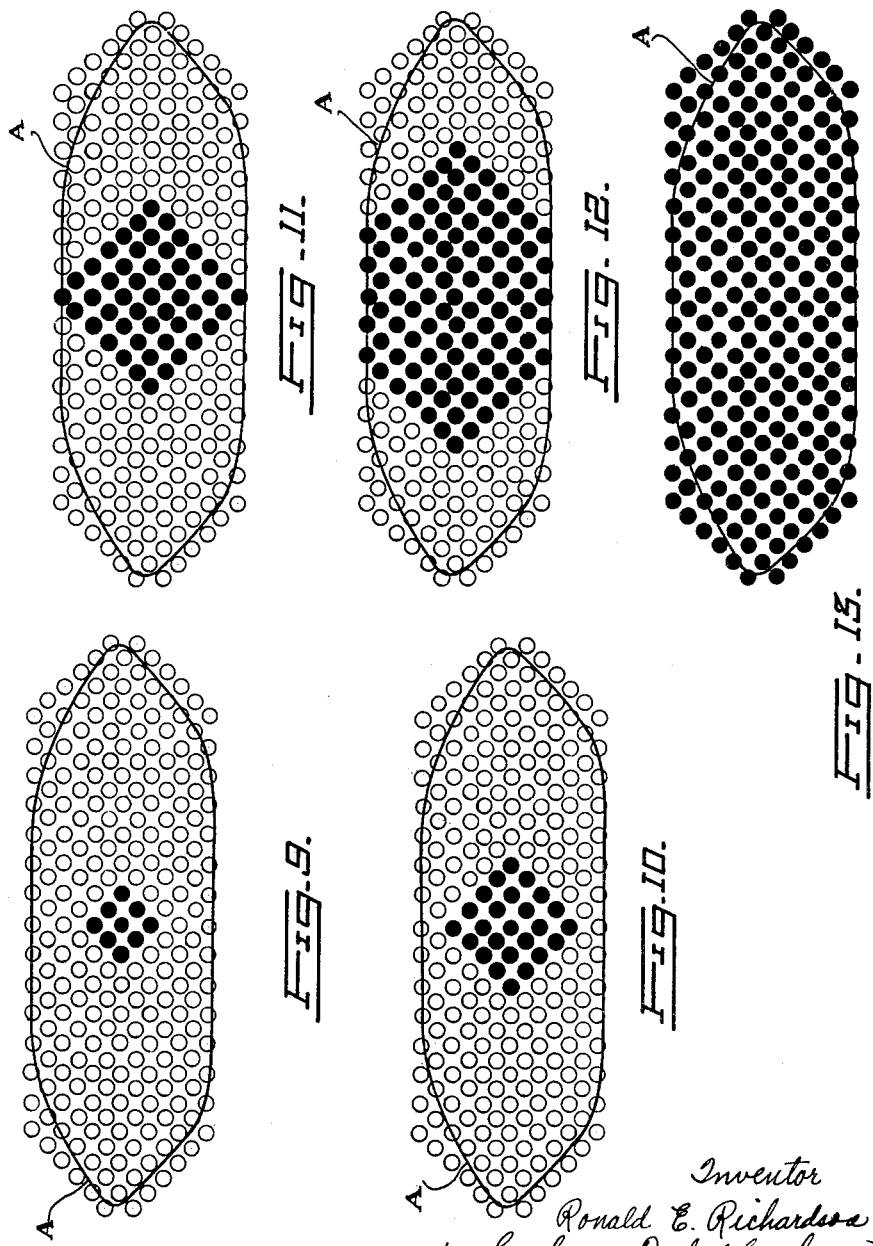

July 24, 1962 R. E. RICHARDSON 3,046,169
PREPRESSING OF LAMINATED SAFETY GLASS PANELS
Filed March 17, 1958 8 Sheets-Sheet 8

Inventor
Ronald E. Richardson
By Cushman, Darby &
Cushman
Attorneys

United States Patent Office 3,046,169
Patented July 24, 1962

3,046,169
PREPRESSING OF LAMINATED SAFETY
GLASS PANELS
Ronald E. Richardson, Oshawa, Ontario, Canada, assignor to Pittsburgh Plate Glass Company, Pittsburgh, Pa.
Filed Mar. 17, 1958, Ser. No. 721,917
13 Claims. (Cl. 154—2.7)

This invention relates to improved apparatus and methods for the prepressing of laminated safety glass panels. Such panels comprise two sheets of glass, each flat or curved, and a thermoplastic interlayer. The present invention is especially directed towards apparatus and methods for use in the prepressing (i.e. preliminary pressing) of large curved laminated glass assemblies, i.e. those suitable for use as windshields of automobiles.

In the manufacture of laminated safety glass, it is customary finally to seal the plastic interlayer to the two sheets of glass by the application of heat and pressure in an autoclave under a fluid, such as oil. It is, however, first necessary to prepress or seal a marginal area of the assembly before placing it in the fluid in the autoclave, since if this were not done, fluid would penetrate between the layers and be trapped therein during the final laminating process and spoil the appearance of the assembly. The prepressing treatment is also necessary to remove as far as possible any air trapped between the interlayer and the two sheets of glass, because any air that does remain will appear in the final assembly in the form of air bubbles which are deleterious to appearance and optical properties.

Numerous methods have been developed for prepressing laminated glass assemblies. A common method is for the assembly to be subjected to mild heating and then passed between a pair of resilient nipper rolls. When more than two sheets of glass and more than one sheet of thermoplastic interlayer are to be formed into a composite assembly, it is common to place the assembly in an oil-resistant bag which is then sealed and evacuated so that the whole apparatus can be immersed in the oil of an autoclave for the final pressing. In this manner a prepressing operation is avoided, but the bag method is expensive in time and labour.

The modern trend in design of automobile windshields calling for larger and larger sheets of glass, usually with wrap-around ends (that is, end portions sharply bent in relation to the main body of the glass) has presented difficulties in the prepressing of laminated glass assemblies for use as automobile windshields, and these difficulties have led to increased complexity in the apparatus developed for prepressing such assemblies. In addition to the wrap-around ends, such assemblies sometimes incorporate a transverse curvature in the central section of the glass.

It is an object of the present invention to provide an improved method and apparatus for prepressing a laminated glass assembly so that it can be satisfactorily subjected to a final sealing operation by direct immersion in an autoclave.

It is a further object of the present invention to provide apparatus and method especially adapted for the prepressing of curved laminated glass assemblies, especially those having end sections joined to the central section of the glass by portions having a small radius of curvature.

A further object is to provide an improved method and apparatus for the prepressing of curved laminated glass assemblies having complex curvatures, that is a transverse curvature in addition to a longitudinal curvature, or a twisting of the end sections about the longitudinal axis.

A further object of the present invention is to provide an improved method and apparatus for prepressing laminated glass assemblies in a manner especially conducive to the removal of substantially all the air from between the layers.

A still further object of the invention is to provide improved apparatus for prepressing laminated glass assemblies in which such apparatus is comparatively readily adaptable to minor modifications of glass shape.

In its broadest form, the invention may be defined as apparatus for prepressing curved laminated safety glass panels, comprising a bank of presser heads, each presser head having a face of resilient material, means for supporting and separately moving each of said presser heads in a direction normal to said face, means for positioning one of said panels in register with said bank of presser heads and for resisting forces exerted on said panel by said heads, said moving means being arranged for movement of each said presser head between an open position displaced from said panel positioning means for placement of one of said panels on said positioning means and a closed position for pressing engagement with said placed panel to force said placed panel against said positioning means. Said panel positioning means will preferably comprise a second bank of presser heads each similarly separately movable between an open and a closed position, or it may consist of a supporting member and a sheet of material having a continuous resilient surface conforming substantially to the shape of the glass panel to be prepressed.

Methodwise, the invention may be considered as the provision in a method of prepressing a laminated safety glass panel of the steps of imposing a static pattern of localized squeezing pressure on a first area of said panel located remote from the periphery thereof, and subsequently imposing a static pattern of localized squeezing pressure on at least one further area of said panel nearer said periphery than said first area.

One form of apparatus constructed and operating in accordance with the present invention is illustrated by way of example in the accompanying drawings, in which:

FIGURE 3 is a view similar to FIGURE 2 showing the parts of the apparatus in the closed or glass-pressing position;

FIGURE 4 is an exploded view of a pair of presser heads of this apparatus on an enlarged scale, showing the heads in the open position with one of the heads shown in central section;

FIGURE 5 is a view on the line V—V in FIGURE 4;

FIGURE 6 is a view corresponding to FIGURE 4 with the heads in the closed position;

FIGURE 8 is a developed view taken on the line VIII—VIII in FIGURE 2, constituting a development of the lower bank of presser heads as seen through the glass;

FIGURES 9 to 13 are a series of diagrams corresponding to FIGURE 8 and illustrating successive stages in one manner of operation of the apparatus.

Figure 1:
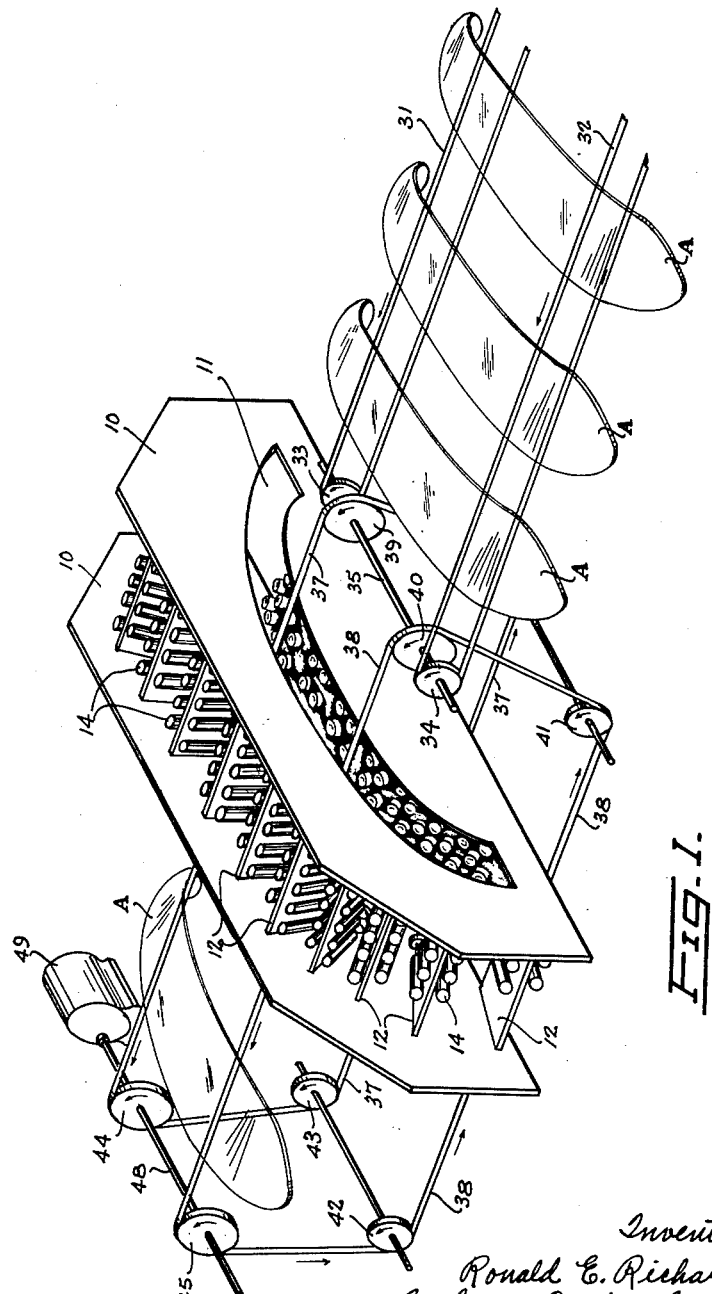
FIGURE 1 is a schematic perspective view of the entire apparatus and a conveyor for feeding laminated glass assemblies thereto.

The apparatus of FIGURES 1 to 8 consists of a pair of frame members in the form of a pair of parallel, spaced apart plates 10 each provided with an aperture 11 of the general shape of the laminated glass assemblies. Between the two plates 10 there extend two series of transverse plates 12 and 13, the series of plates 12 extending around the upper part of the space defined between the main plates 10 and the series of plates 13 extending around the lower part of such space, both such series being grouped to define between them an area of generally similar shape to that of the apertures 11.

Secured to the upper plates 12 are a number of pneumatically operated cylinders 14 arranged on both sides of each plate. Similar pneumatically operated cylinders 15 are secured to each side of each of the lower plates 13. The piston rod 14a connected to the piston co-operating with each of the cylinders 14 carries on its outer end a presser head 16 and the piston rods 15a connected to the pistons of respective lower cylinders 15 carry similar presser heads 17. In this manner the upper and lower banks of presser heads so formed define between them a cavity conforming in shape to that of the glass panels to be prepressed.

These presser heads are formed of rubber or other suitable resilient material, and their detailed structure is best seen from FIGURES 4 and 5 which show a pair of such heads 16 and 17 disposed on opposite sides of a laminated glass assembly A. The heads 16 and 17 are identical and accordingly only one has been shown in cross-section. They are cylindrical in shape and each comprises a main body 18 of vulcanized rubber formed with an annular cavity 19 on an end face defining a central circular projection 20 and a peripheral annular projection 21. Towards the rear of the body 18 there is embedded in the rubber a steel plate 22 having apertures 23 therein through which the rubber is moulded so as to bond the parts firmly together. Secured to the centre of the plate 22 is a hemispherical nipple 24 that serves as a ball joint to co-operate with a complementary socket formed in the end of a main thrust member 25 which is also embedded in the body 18 and firmly held in place by annular projections 26 which engage and grip the rubber which is moulded around them and at this point is formed up into a neck 27. The thrust member 25 is formed with an internal screw thread in which engages a threaded pin 28 formed on the end of the piston rod 14a or 15a.

The function of the ball and socket joint formed between the nipple 24 and the thrust member 25 is to enable transmission of substantial vertical forces, while permitting a measure of pivotable motion, should this be necessary. Ideally it will be arranged that the presser heads will engage the glass surfaces with the end face of each head as far as possible parallel with a glass surface, but, due to the complex shapes to be prepressed, this may not always be possible. In FIGURE 4, for the purposes of demonstration, the glass assembly A has been assumed to lie at an angle to the parallel end faces of the opposing presser heads 16 and 17. FIGURE 6 demonstrates how, upon bringing these heads together and transmitting compressive forces through the piston rods, the ball and socket connections enable the heads 16 and 17 to twist sufficiently to engage in parallel relationship with the outer surfaces of the glass assembly A. At the same time, the compression will cause the rubber in direct contact with the glass to be squeezed outwardly as indicated at 30.

Figure 2:
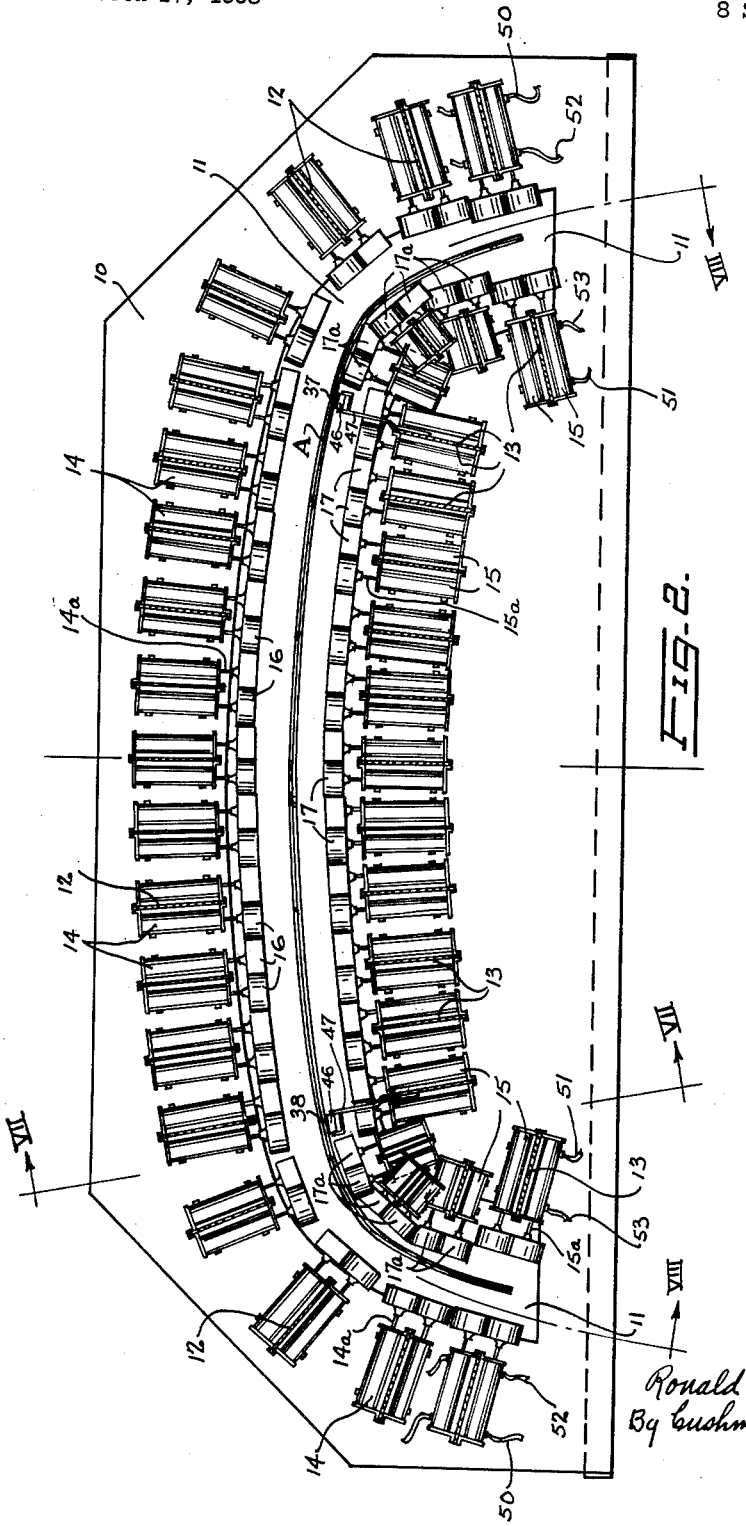
FIGURE 2 is a front view of the apparatus with one plate removed showing the parts in the open, glass-loading position.
Figure 7:
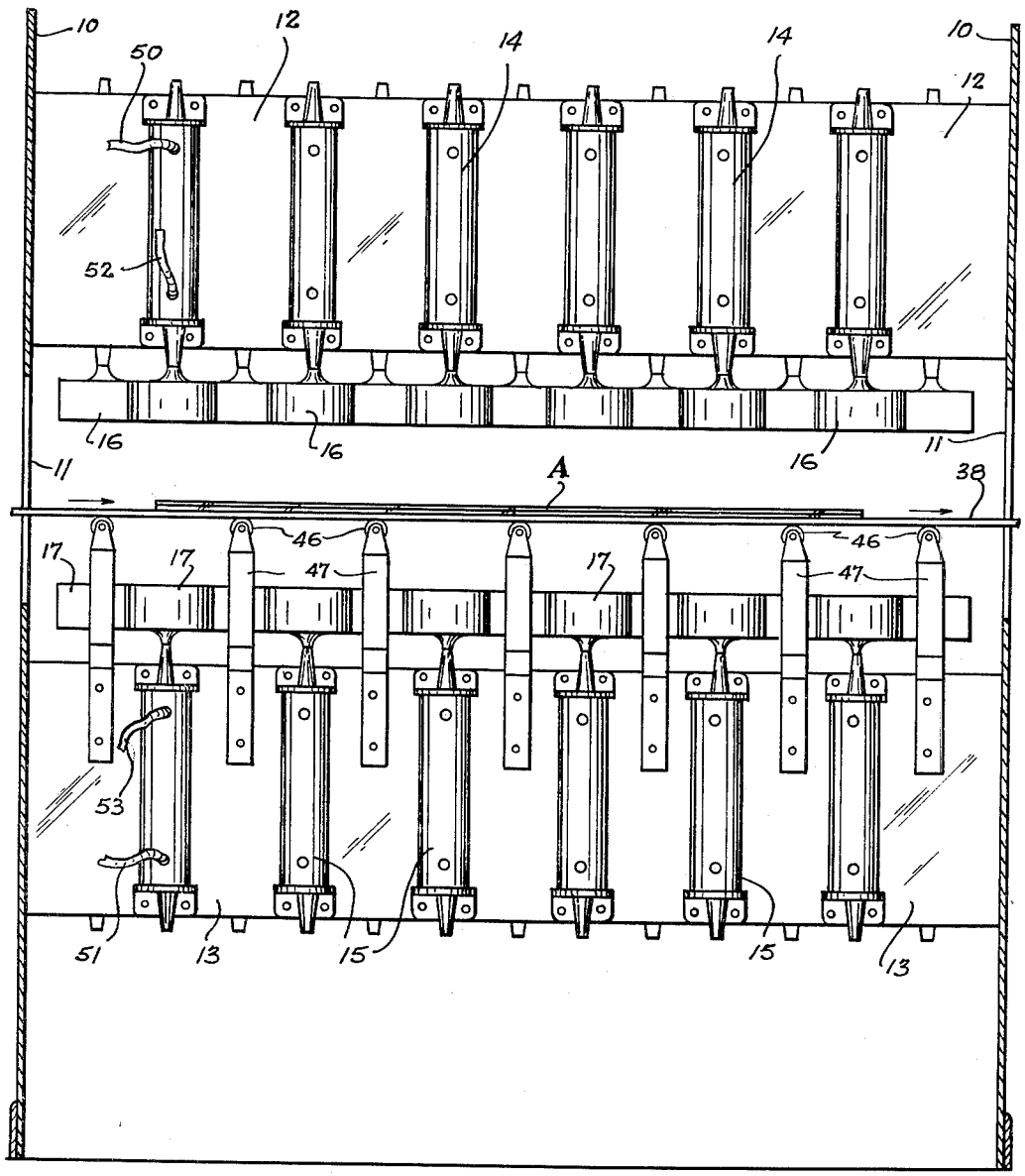
FIGURE 7 is a view on the plane VII—VII in FIGURE 2.

The arrangement of the cylinders 14 and 15 on the various plates 12 and 13 is best appreciated from FIGURES 2, 7 and 8, particularly FIGURE 8 which is a diagrammatic developed view of the array of presser heads 17 presented to the under surface of the glass assembly A. By staggering the arrangement of the cylinders on respective sides of each plate 12 and 13, the corresponding presser heads 16 and 17, which are of greater diameter than their associated cylinders, are caused to overlap the plane of the associated such plate with the effect that the two rows of presser heads partly nest one within the other, as is best seen from FIGURE 8. By placing the plates 12 and 13 near enough to one another, and by staggering the presser heads that face one another from adjacent sides of neighboring plates a similar nesting effect is obtained. The result is a very close array of heads with only comparatively small areas of glass unsubjected to the direct pressure of a presser head. FIGURE 8 shows that, for a typically shaped tapered glass assembly A, the number of presser heads employed at the ends of the apparatus can be reduced below that required at the centre of the apparatus by virtue of the lesser width of the glass at its ends. Provided sufficient heads are employed to cover the entire area of the glass, the number of heads at each end may be reduced as required.

Referring again to FIGURE 1, this figure shows diagrammatically a pair of conveyor belts 31 and 32 travelling over driving wheels 33 and 34 respectively, these wheels being mounted on and keyed to shaft 35. The conveyor belts 31 and 32 serve to transport glass assemblies A to the prepressing apparatus which such assemblies enter by means of further conveyor belts 37 and 38 passing around driving wheels 39, 40 mounted on and keyed to shaft 35 and idler wheels 41, 42, 43, and a further wheel hidden by one of the assemblies A. Conveyor belts 37 and 38 are driven by wheels 44 and 45 keyed to shaft 48 driven by motor 49, and thus drive conveyor belts 31 and 32 through wheels 39, 40, shaft 35 and wheels 33 and 34. The upper spans of the belts 37 and 38 pass through the apertures 11 in the plates 10 and through the cavity defined between the two banks of presser heads 16 and 17, being supported therein on rollers 46 mounted between heads 17 on vertical support members 47 fixed to the nearest plate 13.

When it is desired to load an assembly A into the apparatus, the conveyor system is stepped forward sufficiently to bring one such assembly into position between the plates 10 and in register with the plunger heads 16 and 17 in the alignment diagrammatically illustrated in FIGURE 8. It will be noted from FIGURE 2 that at each end of the apparatus three rows of lower cylinders towards the ends of the apparatus and immediately below the sharply curved portions of the glass are shorter and are mounted somewhat higher than the remaining cylinders 15. The presser heads 17a associated with these short cylinders are correspondingly in raised positions. As an assembly A is carried into the apparatus by conveyor belts 37 and 38, each of its ends slides lightly along the top of one or more of these presser heads 17a partly resting on them.

The assembly A is then in position for the carrying out of a prepressing operation. This is effected by admitting air under pressure to the remote ends of each of the cylinders 14 and 15 through air supply pipes 50 and 51. The effect will be to cause the cavity defined between the banks of presser heads to be reduced in width from the open, glass-loading condition shown in FIGURES 2 and 7, to the closed, glass-pressing condition of FIGURE 3, and thereby to exert a pattern of pressure on the glass panel.

All the cylinders 14 and 15 can be energized simultaneously if desired, but an advantageous feature of the present invention is the facility it affords for operating the presser heads independently and preferably in a predetermined sequence working outwardly from the centre of the glass. If the presser heads at the centre of the glass both longitudinally and transversely are operated first (as illustrated in FIGURE 9 by the darkened central group of heads); then those presser heads immediately surrounding the already operating ones are operated and so on in an expanding manner (as demonstrated by the sequence of FIGURES 10 to 13), the pressure brought to bear on the assembly A commences at the centre and moves outwardly towards the lateral edges and towards the longitudinal ends. This action will tend to facilitate and encourage flow of any air trapped between the layers in a direction outwardly towards and beyond one or other of the edges.

To release the pressure, the air is allowed to escape from pipes 50 and 51 and air is admitted to pipes 52 and 53 to ensure positively that all presser heads are sufficiently retracted.

An important feature of the apparatus described is its flexibility. Various different patterns of glass curvature can be pressed with the same apparatus. This advantage flows from the independent operation of each of the presser heads and their consequent ability to take up, within limits, whatever position the glass dictates.

Although the invention has been illustrated as applied to the prepressing of windshields of simple curvature, it is clearly applicable to those of complex curvature, that is those having a transverse as well as a longitudinal curvature. To provide for such transverse curvature, it is only necessary to incline the pressure applying cylinders to one another in the transverse planes (FIGURE 7), in addition to the relative inclination imparted to the cylinders in the longitudinal direction.

Furthermore, although it is preferred that each presser head of one set exactly opposes a presser head of the other set, this is not essential by virtue of the close spacing between heads, so that one set can be offset in relation to the other.

Figure 14:
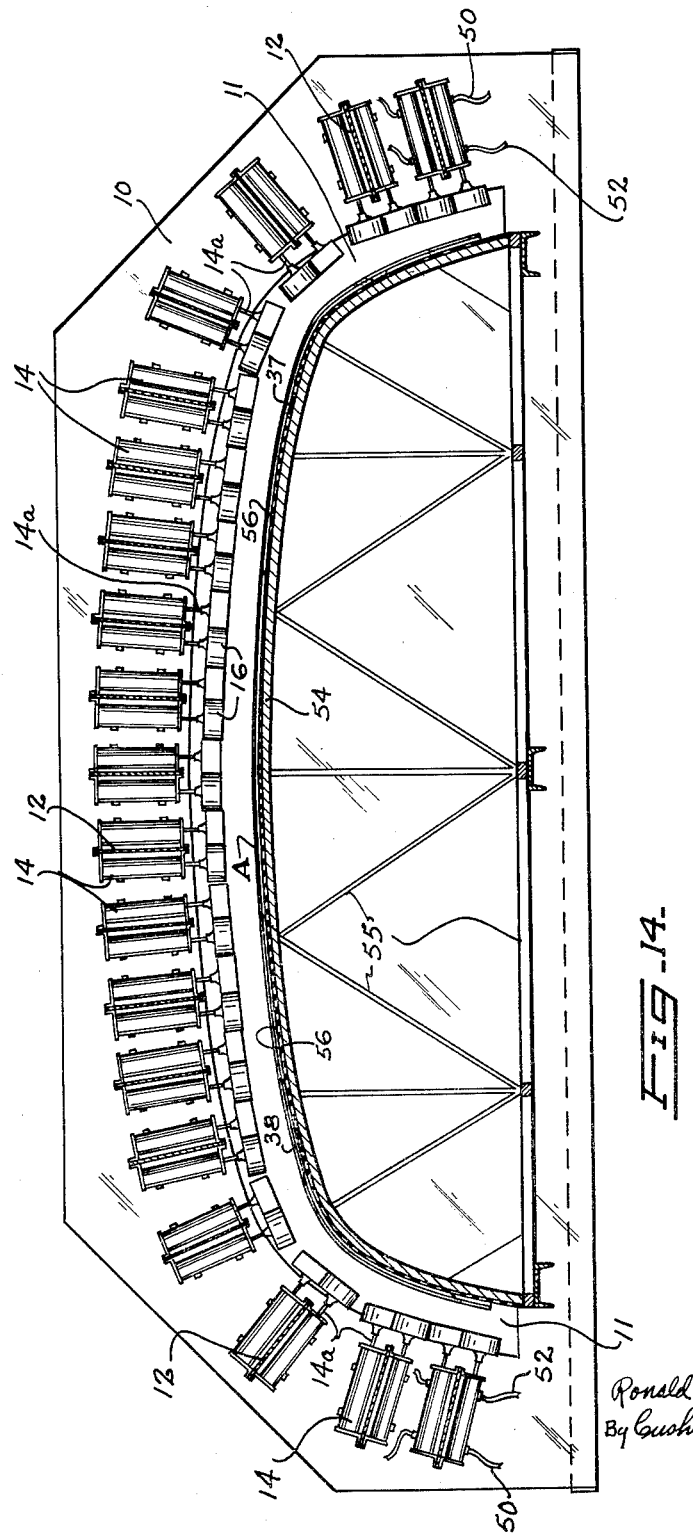
FIGURE 14 is a front view similar to FIGURE 2 showing a modified structure.

Finally, it is possible to substitute a fixed surface for one of the banks of presser heads. Such an arrangement is shown in FIGURE 14. The upper bank of presser heads 16 is retained, but the lower bank of heads 17, 17a is replaced by a continuous rigid curved backing member 54 conforming to the shape of the bent glass assembly A and supported by a framework 55. The backing member 54 is provided with a resilient facing sheet 56 of rubber or other suitable resilient material of a like nature to that of which the presser heads 16 are made. The presser heads 16 are operated in the same manner as before and act to press the glass assembly A against the member 54. Although this modified structure does not have quite as much flexibility as the structure illustrated in FIGURES 1 to 8, insofar as a given member 54 will only be usable with a given shape of glass panel and it will be necessary to fit a different such backing member when it is desired to change from the pressing of one shape of glass assembly to another, this structure still retains the other valuable feature of the invention inherent in the ability afforded by the independent operation of the presser head cylinders to exert the initial squeezing pressure centrally of the glass panel, as shown in FIGURE 9, and expand such pressure outward in successive steps towards the peripheral edges of the panel, in the manner illustrated in FIGURES 10 to 13.

I claim:

1. Apparatus for prepressing curved laminated safety glass panels, comprising a bank of presser heads, each presser head having a face of resilient material, means for supporting and separately moving each of said presser heads in a direction normal to said face, means for positioning one of said panels in register with said bank of presser heads and for resisting forces exerted on said panel by said heads, said moving means being arranged for movement of each said presser head between an open position displaced from said panel positioning means for placement of one of said panels on said positioning means and a closed position in which the face of said presser head is in direct contact with said placed panel to force said placed panel against said positioning means, the faces of the presser heads of the bank cooperating, upon movement of the bank into the closed position, to define a curved, discontinuous panel-contacting surface.

2. Apparatus for prepressing curved laminated safety glass panels, comprising two banks of presser heads, each presser head having a face of resilient material, means for supporting and separately moving each of said presser heads in a direction normal to said face, said moving means being arranged for movement of each said bank of presser heads between an open position for placement of one of said panels between said banks and a closed position in which the faces of the presser heads of said banks press directly against opposite sides of said placed panel, the faces of the presser heads of each bank co-operating, upon movement of the bank into the closed position, to define a curved, discontinuous panel-contacting surface.

3. Apparatus as claimed in claim 1, wherein said panel positioning means comprises a supporting member and a sheet of material having a continuous resilient surface conforming substantially to the shape of the glass panel to be prepressed.

4. Apparatus for prepressing curved laminated safety glass panels, comprising an upper and a lower frame, a plurality of fluid-pressure-operated cylinders mounted on each said frame, pistons co-operating respectively with each of said cylinders, piston rods connected respectively to each of said pistons, and presser heads of resilient material connected respectively to each of said piston rods, said presser heads being so disposed as to form an upper bank of presser heads associated with said upper frame and a lower bank of presser heads associated with said lower frame, said banks of presser heads defining between them a cavity conforming in shape to that of a glass panel to be prepressed and variable in width between an open, glass loading condition when said piston rods are withdrawn into their associated cylinders, and a closed, glass engaging and pressing condition with said presser heads directly contacting said panel when said piston rods are forced into extended position from their associated cylinders, the presser heads of each bank serving, upon movement of the bank into the closed position, to form a curved, discontinuous panel-contacting surface.

5. Apparatus according to claim 4, wherein said cylinders are arranged on said frames in series of closely spaced parallel rows each comprising a plurality of cylinders, the individual cylinders of each row being staggered in relation to the individual cylinders of each neighbouring row, whereby each row partially nests within each neighbouring row.

6. Apparatus according to claim 4, wherein each said presser head defines a generally flat glass-engaging surface on its side remote from its associated cylinder and includes means connecting it to its associated piston rod with said glass-engaging surface lying generally transverse to the longitudinal axis of said piston rod, said connecting means being so constructed and arranged as to permit relative pivotal motion between said head and said piston rod simultaneously about two mutually transverse axes both perpendicular to said axis of said piston rod whereby to enable orientation of said glass-engaging surface into face-to-face pressure-transmitting relationship with a glass surface deviating somewhat from a plane normal to said axis of said piston rod.

7. Apparatus according to claim 4, wherein each of said piston rods associated with the upper bank of presser heads extends coaxially with a corresponding piston rod associated with said lower bank of presser heads whereby, in the closed, glass engaging and pressing condition, the presser heads of each such pair of corresponding presser heads press against opposite surfaces of the glass panel in register with each other.

8. In a method of prepressing a curved laminated safety panel comprising two curved sheets of glass and a plastic interlayer between said two curved sheets, the improvement comprising first imposing a localized squeezing pressure directly on a first area of said curved panel remote from the extremities of said curved panel, and then imposing localized squeezing pressure directly on a second area immediately surrounding said first area on all sides while maintaining the localized squeezing pressure upon said first area and prior to imposition of squeezing pressure upon any part of said curved panel outside said first and second areas.

9. The improvement according to claim 8 comprising imposing localized squeezing pressure directly on a third area immediately surrounding said second area on all sides while maintaining the localized squeezing pressure upon said first and second areas and prior to imposition of squeezing pressure on any area of said curved panel outside said first, second and third areas.

10. The improvement according to claim 8 wherein localized squeezing pressure is sequentially imposed directly on further areas of said curved panel located immediately outwardly of previously pressed areas until substantially the entire curved panel is subjected to localized squeezing pressure, the imposition of localized squeezing pressure upon each said further area being effected prior to imposition of squeezing pressure on any part of said panel outside said further area and while maintaining localized squeezing pressure on previously pressed areas.

11. In a method of prepressing a curved laminated safety panel comprising two curved sheets of glass and a plastic interlayer between said curved glass sheets, the improvement comprising first imposing a static pattern of localized squeezing pressure directly on a first area of said curved panel remote from the extremities of said curved panel, and then imposing a plurality of further static patterns of localized squeezing pressure directly on second areas of said panel discrete from one another and from said first area and immediately surrounding said first area on all sides while maintaining squeezing pressure upon said first area and prior to imposition of squeezing pressure upon any part of said curved panel outside said first and second areas.

12. The improvement according to claim 11 comprising imposing a plurality of further static patterns of localized squeezing pressure directly on third areas of said curved panel discrete from one another and from said first and second areas and surrounding second areas on all sides while maintaining squeezing pressure on said first and second areas and prior to imposition of squeezing pressure on any area of said curved panel outside said first, second and third areas.

13. The improvement according to claim 11 wherein a plurality of static patterns of localized squeezing pressure are imposed directly on further areas of said curved panel located immediately outwardly of areas to which localized squeezing pressure has already been applied, until the squeezing action has been extended to the periphery of the curved panel on all sides, the imposition of localized squeezing pressure upon each said further area being effected prior to imposition of squeezing pressure on any part of said curved panel outside said further area and while maintaining localized squeezing pressure on previously pressed areas.

References Cited in the file of this patent

UNITED STATES PATENTS

| | | |
|---|---|---|
| 1,334,588 | Bartelstone | Mar. 23, 1920 |
| 1,960,580 | Fraser | May 29, 1934 |
| 1,992,976 | Watkins | Mar. 5, 1935 |
| 2,182,358 | Sherts et al. | Dec. 5, 1939 |
| 2,340,933 | Chilton | Feb. 8, 1944 |
| 2,470,461 | Black | May 17, 1949 |
| 2,628,177 | Boicey et al. | Feb. 10, 1953 |

FOREIGN PATENTS

| | | |
|---|---|---|
| 989,338 | France | May 23, 1951 |